(12) United States Patent
Pokrajac et al.

(10) Patent No.: US 9,875,628 B2
(45) Date of Patent: Jan. 23, 2018

(54) DISPOSABLE ANTI-TAMPER CONDUCTIVE PLASTIC BAND FOR RE-USABLE RFID TAG

(71) Applicants: Dalibor Pokrajac, Coquitlam (CA); Bazlul Karim, Richmond (CA)

(72) Inventors: Dalibor Pokrajac, Coquitlam (CA); Bazlul Karim, Richmond (CA)

(73) Assignee: Guard RFID Solutions Inc., Delta, BC (CA)

( * ) Notice: Subject to any disclaimer, the term of this patent is extended or adjusted under 35 U.S.C. 154(b) by 285 days.

(21) Appl. No.: 14/389,547

(22) PCT Filed: Apr. 2, 2013

(86) PCT No.: PCT/CA2013/050263
§ 371 (c)(1),
(2) Date: Sep. 30, 2014

(87) PCT Pub. No.: WO2013/143004
PCT Pub. Date: Oct. 3, 2013

(65) Prior Publication Data
US 2015/0077257 A1    Mar. 19, 2015

(30) Foreign Application Priority Data

Mar. 30, 2012   (CA) .................... 2773150

(51) Int. Cl.
*G08B 13/24*   (2006.01)
*G08B 13/06*   (2006.01)
(Continued)

(52) U.S. Cl.
CPC ......... *G08B 13/2434* (2013.01); *G01V 15/00* (2013.01); *G08B 13/06* (2013.01); *G08B 21/02* (2013.01); *G08B 21/22* (2013.01)

(58) Field of Classification Search
CPC .... G08B 13/06; G08B 13/2434; G08B 21/02; G08B 21/0286; G08B 21/22; G01V 15/00;
(Continued)

(56) References Cited

U.S. PATENT DOCUMENTS 5,014,040 A    5/1991  Weaver
5,612,674 A    3/1997  Tice
(Continued)

FOREIGN PATENT DOCUMENTS

GB        2442809 A       4/2008
WO    WO 2009053667       4/2009

*Primary Examiner* — Orlando Bousono (57) ABSTRACT

A disposable electrically conductive band for a re-usable RFID tag having an RFID tag holder, an electrical continuity contact within a loop on an end of the band, an electrically conductive landing area on a tongue of the band, the tongue being insertable through the loop to secure the band around a body to be monitored by an RFID system, the tongue thereby engaging a portion of the landing area with the electrical continuity contact. The conductive landing area has a series of electrical continuity dimples in each of which there is an electrical contact to an electrical pathway around the electrically conductive band. The RFID tag transmits an alarm to the monitoring agency whenever the band has been tampered with, severed, or otherwise circumvented.

16 Claims, 10 Drawing Sheets

(51) Int. Cl.
  *G08B 21/02* (2006.01)
  *G08B 21/22* (2006.01)
  *G01V 15/00* (2006.01)

(58) Field of Classification Search
  CPC ....... G06K 19/07381; G06K 19/07749; G06K 19/07762
  See application file for complete search history.

(56) References Cited

U.S. PATENT DOCUMENTS

| | | | | |
|---|---|---|---|---|
| 2003/0052782 A1* | 3/2003 | Maloney | ............ | G08B 21/0288 340/568.4 |
| 2004/0172554 A1* | 9/2004 | Maloney | ............ | G08B 21/0288 361/6 |
| 2005/0248458 A1* | 11/2005 | Girvin | ................ | G06K 19/0739 340/572.3 |
| 2006/0077060 A1* | 4/2006 | Lerch | ............... | G06K 19/07381 340/572.3 |
| 2006/0087437 A1* | 4/2006 | Lerch | ............... | G06K 19/07749 340/572.8 |
| 2006/0092028 A1* | 5/2006 | Lerch | ............... | G06K 19/07381 340/572.8 |
| 2006/0255947 A1* | 11/2006 | Redler | ............. | G06K 19/07749 340/572.7 |
| 2007/0029384 A1* | 2/2007 | Atherton | .............. | G06K 19/073 235/435 |
| 2007/0120687 A1* | 5/2007 | Lerch | ..................... | G06K 19/04 340/572.9 |
| 2007/0222232 A1* | 9/2007 | Held | .................. | G06K 19/07749 292/307 R |
| 2008/0048865 A1* | 2/2008 | Lerch | ............... | G06K 19/07381 340/572.3 |
| 2008/0117058 A1* | 5/2008 | Oberle | .................. | G09F 3/0376 340/572.8 |
| 2009/0315716 A1* | 12/2009 | Lerch | ............... | G06K 19/07381 340/568.2 |
| 2010/0012733 A1* | 1/2010 | Lerch | .................... | G06K 19/04 235/492 |
| 2010/0207769 A1* | 8/2010 | Pokrajac | ............ | G08B 21/0286 340/600 |
| 2010/0289622 A1* | 11/2010 | Hall | ..................... | H01Q 1/2225 340/10.1 |
| 2010/0327002 A1* | 12/2010 | Hegan | ..................... | G09F 3/005 221/30 |
| 2013/0069780 A1 | 3/2013 | Tran | | |

\* cited by examiner

Fig. 8c

DISPOSABLE ANTI-TAMPER CONDUCTIVE PLASTIC BAND FOR RE-USABLE RFID TAG

FIELD OF INVENTION

The disclosed invention relates to the use of radio frequency identification ("RFID") tags to restrict people and objects within a designated perimeter, and more particularly to an RFID tag which transmits an alarm to the monitoring agency whenever the attached tag has been tampered with, severed, or otherwise circumvented.

BACKGROUND OF THE INVENTION

RFID tags can be used to control the movement of people within a designated perimeter. Examples of such use include infant or pediatrics patient protection in a care facility, elder-care wander prevention, or house arrest enforcement where a tagged person is restricted to a monitored area. Effective perimeter restriction is only possible if an alarm is generated when the tag is removed from a monitored person's body.

Existing RFID tag-bands employ a variety of methods to maintain continuity, including embedding conductive traces within or through the band, using a band made entirely of electrically conductive material, optical signal transmission through the optically conductive band, optically conductive fiber(s) embedded within the band, and electromagnetic or capacitive coupling between the band and the tag.

Presently, detection of RFID tag band removal is done by monitoring conductivity of the following electrical current path: A current source within the RFID tag initiates electrical current flow from a metal contact to the outside of the RFID tag enclosure; A mechanical bond is made between metallic contact and an electrically conductive band made out of flexible material with embedded metal conductors; The mechanical bond is semi-secure with intention to reliably maintain electrical contact during normal use; On the other side of the band, there is another metal contact on tag's enclosure which enables electrical current to enter the enclosure and be detected by electronic circuitry.

Any break in electrically conductive path is considered a breach in tag attachment and Tamper Alarm is declared. This conductive path break can come from the band being cut or from detachment between the band and the metal contacts on the tag enclosure. Band cut is always a legitimate cause for signalling tamper alarm, but interruption in electrical current flow between the tag enclosure contacts and the band can occur not only due to physical detachment between the contact and the band, but also due to decreased conductivity which can, and frequently does, occur due to oxidation of metallic contacts or unreliable bond between the contacts and the metallic conductors within the band. The oxidation occurs as a result of cleaning the tag body after every use, usually with aggressive solutions. This is the cause of many false Tamper Alarms.

Some cut-band RFID tags are based on the principle of detecting conductivity of the band surface or conductivity of the band itself (when the entire band is made out of electrically conductive material). In this case, there is a potential for defeating the capability of the tag to detect when the band is being cut by a jumper wire with 2 alligator clips on each end of the wire and clamping alligator clips to the band in a way that they make conductive contact with exposed and conductive parts of the band. In such a case "alligator clip wire" creates a shunt for electrical current and if the band is cut between two alligator clips, the tag can be removed from the person, without detection that the band is cut because the current continues to flow through the alligator clip wire. This is a potential security breach which can be very easily exploited on some bands, that is desirable to eliminate.

Present cut-band RFID tag devices using embedded conductive materials (fibers, traces) are often prone to false alarms due to open circuits caused by normal user wear. What is needed is a cut-band tamper-signalling RFID tag which allows for robust movement of the band and band to tag connection without triggering false alarms, while maintaining the electrical integrity of the device from tampering and attempts to circumvent or remove. Additionally, there are maintenance issues with pre-existing RFID conductive band tags. It would be useful to be able to re-use expensive RFID elements while readily disposing, for hygenic reasons, of conductive band portions that have been used for a designated duration of time on a patient.

SUMMARY OF THE INVENTION

The Anti-tamper Conductive Plastic Band for RFID Tag of the present invention is designed to provide: a device which allows non-restrictive movement of the band and band to tag connection when secured around a wrist or ankle; more robust electrical contact with the tag and continuity around the band; initiation of the tamper alarm if movement is too extreme or attempts are made to circumvent continuity, and significant immunity to "alligator-clip" type and related attacks after the band is secured to the tag.

For the purposes of this invention, reliable detection of current flow interruption is the technology where important improvements are made. These include the shape of the contact within a tag holder loop, the use of conductive plastic embedded within a robust rubber banded tag holder, and anti-tamper elements within the band to tag contact area. The disclosed invention provides a more reliable method of detecting if the band has been cut or loosened so that the tag can be removed from the person, while preventing false triggering and continuity failures due to its more robust design.

Essentially the invention provides an electrically conductive band for an RFID tag having:
a) an RFID tag enclosure;
b) an electrical continuity contact within a loop on an end of the electrically conductive band;
c) an electrically conductive landing area on a tongue of the band;
the tongue being insertable through the loop to secure the band around a body to be monitored by an RFID system, the tongue thereby engaging a portion of the electrically conductive landing area with the electrical continuity contact. The electrically conductive landing area has a series of electrical continuity dimples in each of which there is an electrical contact to an electrical pathway around the electrically conductive band. A preferred structure for the electrical contact within the loop is a pin, shaped to fit within a continuity dimple in the electrically conductive landing area on the tongue. Preferably, the tongue additionally has a series of anti-tamper dimples and the loop has an anti-tamper pin shaped to fit within an anti-tamper dimple in the tongue. The anti-tamper dimples can be arranged as a series of pairs of anti-tamper dimples, with an electrical continuity dimple between each pair, the loop having a corresponding pair of anti-tamper pins, with an electrical continuity pin between the pair of anti-tamper pins.

The loop and the tongue thereby have an interlocking structure of pins and dimples respectively with one-way bevels to form a ratchet mechanism during attachment of the electrically conductive band to an object or a patient, in order to allow easy attachment yet prevent accidental loosening of the band once when it is attached. There should be such one-way (zip-tie principle) bevels for both the anti-tamper pin and corresponding anti-tamper dimples, and the electrical continuity pin and corresponding electrical continuity dimples.

In the electrically conductive band, the RFID tag holder has a loop electrical contact and a band tag contact. A fitting RFID tag would have a complementary couple of RFID electrical contacts each joined with an electrical current detector in the RFID tag. The couple of RFID electrical contacts are located on the RFID tag such that when the RFID tag is inserted in the RFID holder, the RFID electrical contacts make electrical contact with the loop tag electrical contact and the band tag contact respectively. By this means, an electrically conductive circuit is formed when the RFID tag is placed in the RFID holder and the electrically conductive band is attached to a patient or an object by having the tongue passed through the loop—the electrical current detector senses a lack of continuity when the RFID tag is removed from the RFID tag holder causing the RFID tags to signal a tamper alarm condition.

The feature of having an RFID tag inserted within a tag holder which uses a conductive band to make electrical contact between one side of the holder to the other enables disposability of the conductive band and separate retention of the more valuable RFID tag. The complexity of band securement is removed from the RFID tag itself to the disposable conductive band. The RFID tag (which is typically intended to last 12 months) can be re-used with another conductive band.

It is a useful variant for the electrically conductive band to comprise an electrically conductive plastic core within a non-conductive shell, in order to prevent "alligator-clip" circumvention of tamper alarms. There should also be a non-conductive outer shell between electrically conductive dimples on the landing area of the tongue that causes an interruption of electrical current flow when the electrical continuity pin passes from one continuity dimple to another upon the band being loosened after attachment whereby the electrical current detector senses a lack of electrical continuity when the electrical continuity pin passes from one continuity dimple to another and signals a tamper alarm condition.

The RFID electrical contacts can be made of hard conductive plastic and shaped to provide a tight fit within the RFID holder and a water-proof transition between electronic circuitry inside the RFID tag and the tag enclosure. A middle portion of the length of the electrically conductive band can be made thinner than the end portions of the band, to provide flexibility and comfort of fit on a patient. The tongue portion at one end of the electrically conductive band, and the portion around and adjacent to the loop end of the band can be made of the same plastic, but wider and stronger than the middle portion, in order to ensure strength at the juncture and to ensure that the tongue and loop portions can endure the force required to insert the tongue portion through the (tight-tolerance) loop at the other end of the electrically conductive band.

The electrically conductive band has a curved section bending from the RFID tag holder to position the band closer to a patient's wrist to which the electrically conductive band may be attached. The RFID tag holder has an opening into which an RFID tag is placed prior to attachment to a patient's wrist, with the electrically conductive band and a base portion of the RFID holder thereby securing the RFID tag within the holder and against the patient wrist after attachment of the electrically conductive band and around a patient's wrist.

DETAILED DESCRIPTION

All elements will now be introduced by reference to figures, then how each element functions and interacts with each other element will be described where relevant.

Figures 1A, 1B, 1C:
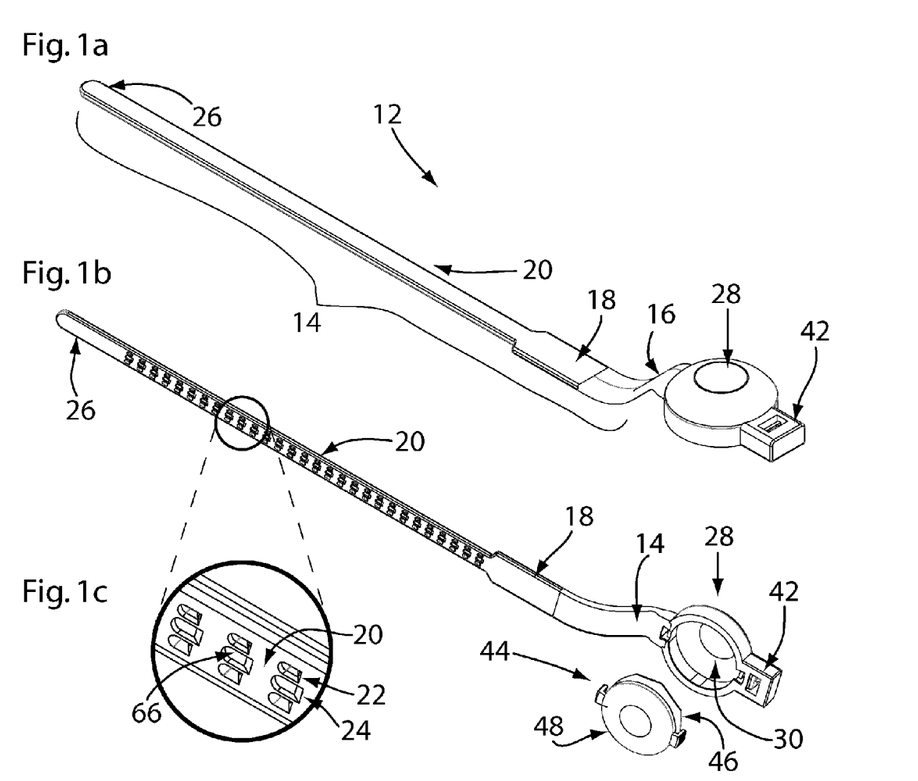
FIG. 1a shows a top isometric view of a banded tag holder and the band.
FIG. 1b shows a bottom isometric view of a banded tag holder and the band with its RFID tag enclosure about to be inserted.
FIG. 1c shows a bottom close-up view of securement section dimples.

FIG. 1a shows a top isometric view of a banded tag holder 12 which is comprised of a band 14, tag holder 28 and conductive plastic core 64. (see FIGS. 2c & 3c for latter) These three elements are molded as one unit, but will be treated separately for clarity of discussion. The band 14 includes a curved section 16, flange section 18, securement section 20, and tongue 26. The curved section 16 pre-forms the band 14 to accommodate fitting around a wearer's appendage and to reduce mechanical stress. The flange section 18 provides a thicker portion of the band 14 that is less binding on the wearer when the securement section 20 is tightened as it is inserted through the loop 42. The tongue 26 is the end portion of the band 14 that is first inserted into the loop 42 and is rounded for easier insertion and has raised projections on the top (see FIG. 2a) for easier gripping. FIG. 1b shows a bottom isometric view of the banded tag holder 12 with its tag enclosure 44 about to be inserted into the cup 30 of the tag holder 28. Shown here the tag enclosure 44 is comprised of a cap 46 and a base 48. FIG. 1c shows a bottom close-up view of the anti-tamper dimples 22 and continuity dimples 24 of the securement section 20 of the band 14. FIG. 1c also shows the internal band core 66 visible at the bottom of each continuity dimple 24, part of the conductive plastic core 66 embedded inside the banded tag holder 12 as shown in FIGS. 2c and 3c.

Figures 2A, 2B:
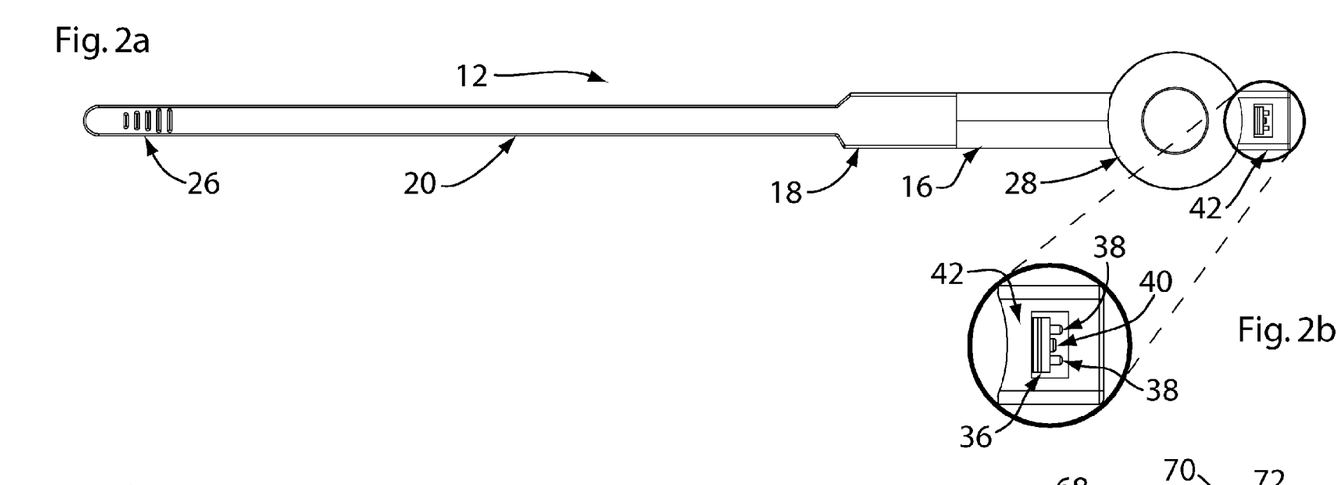
FIG. 2a shows a top view of a banded tag holder.
FIG. 2b shows a top close-up view of loop elements.
Figure 2C:
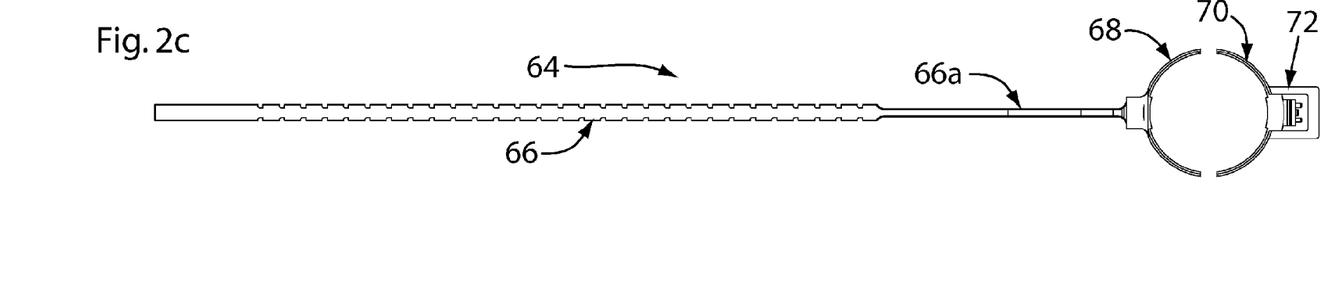
FIG. 2c shows a top view of conductive plastic core elements.

FIG. 2a shows a top view of a banded tag holder 12, while FIG. 2b shows a top close-up view of loop 42 elements, including pawl arm 36, anti-tamper pins 38 and continuity pin 40. FIG. 2c shows a top view of the conductive plastic core elements 64, including a band core 66, band holder core 68, loop holder core 70 and loop core 72.

Figures 3A, 3B:
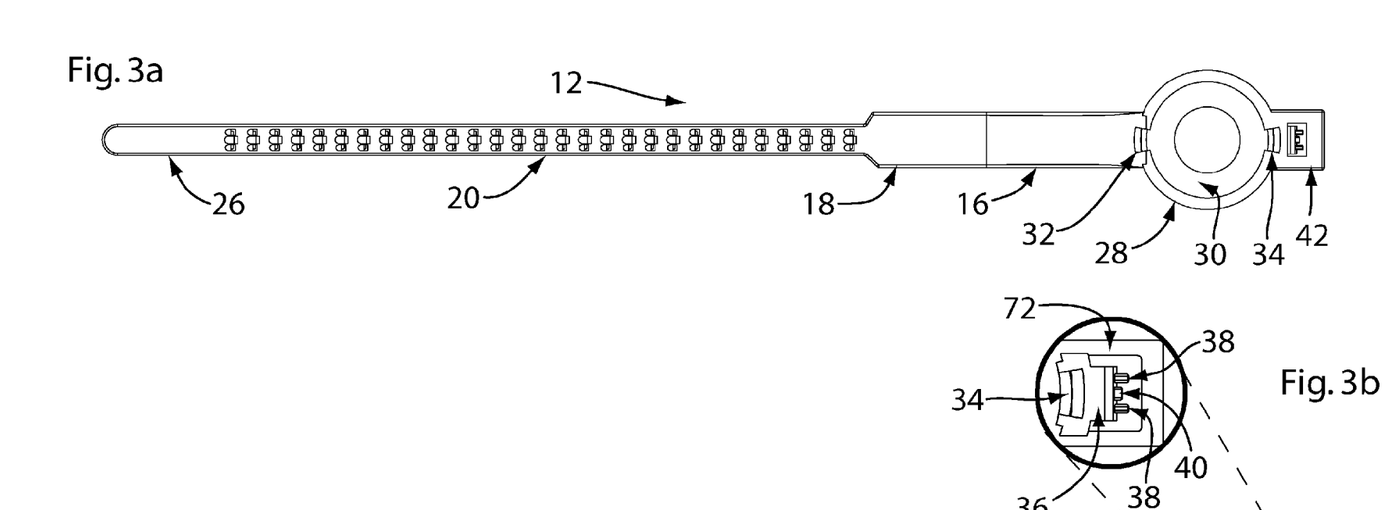
FIG. 3a shows a bottom view of a banded tag holder.
FIG. 3b shows a bottom close-up view of loop core elements.
Figure 3C:
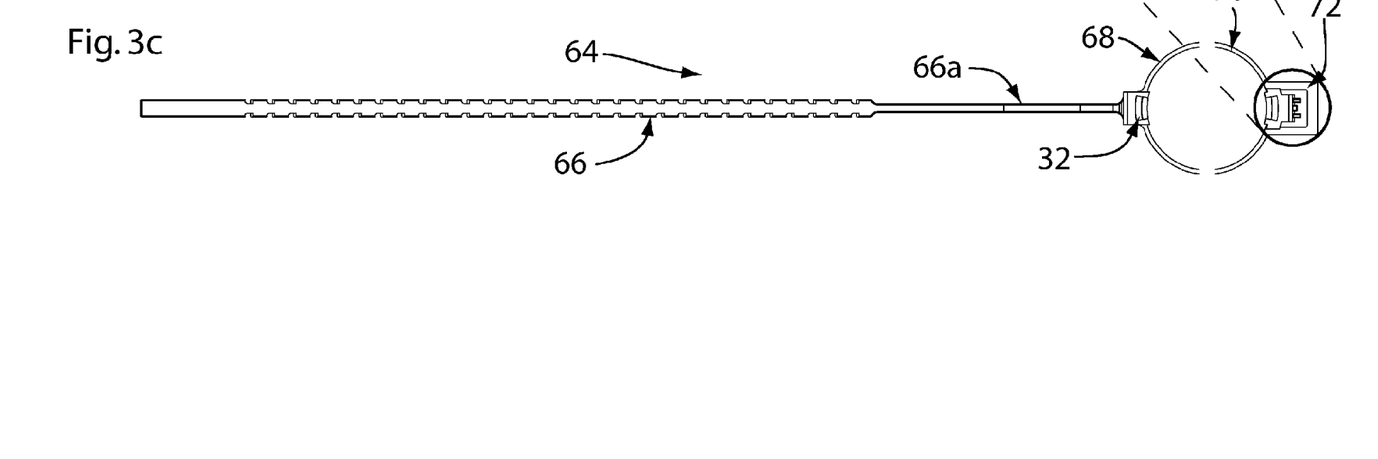
FIG. 3c shows a bottom view of conductive plastic core elements.

FIG. 3a shows a bottom view of a banded tag holder 12 with its cap receptacle 30, band tag contact 32 and loop tag contact 34. FIG. 3b shows a bottom close-up view of loop core elements 72 shown in FIG. 3c, including loop tag contact 34, pawl arm 36, anti-tamper pins 38 and continuity pin 40. FIG. 3c shows a bottom view of conductive plastic core 64 elements including band core 66, band tag contact 32, band holder core 68, loop holder core 70, and loop core 72.

Figure 4A:
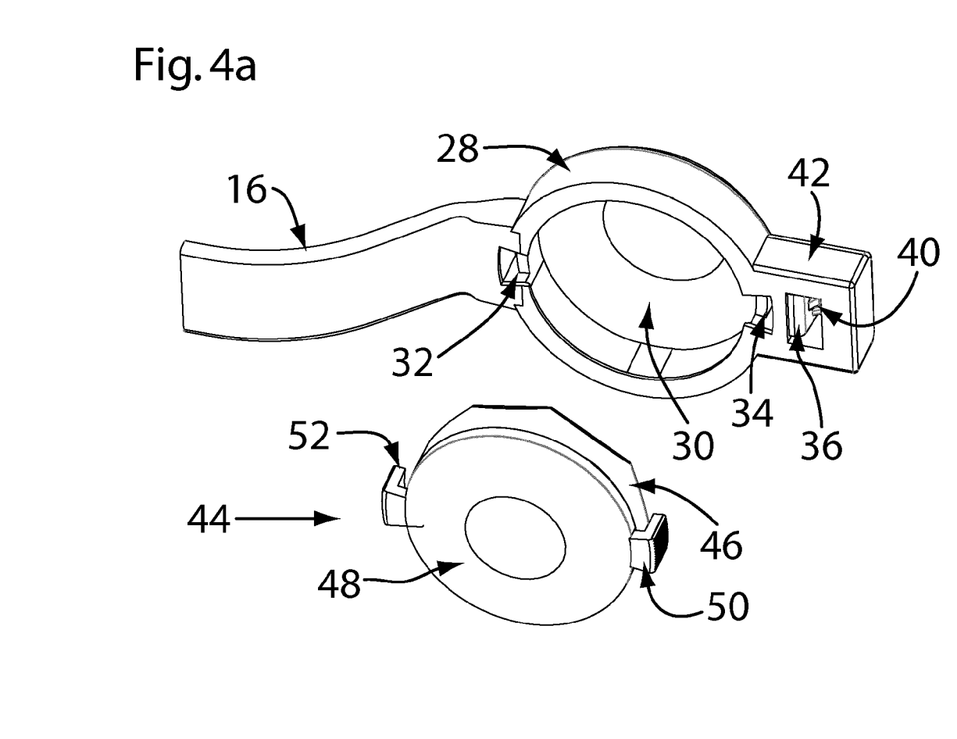
FIG. 4a shows a bottom isometric close-up view of a tag holder with its mated RFID tag enclosure.
Figure 4B:
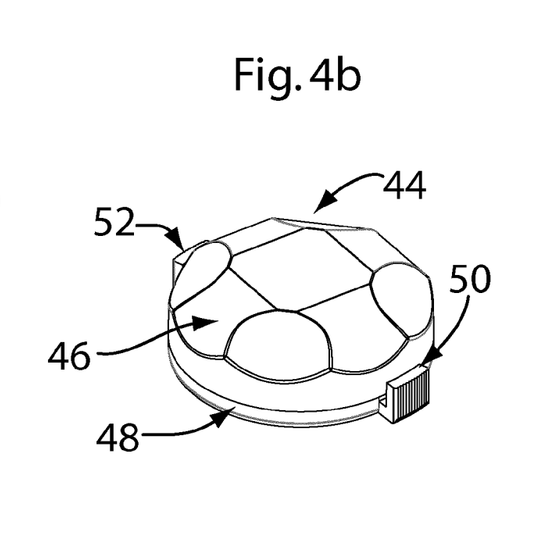
FIG. 4b shows a top isometric view of an RFID tag enclosure.

FIG. 4a shows a bottom isometric close-up view of a tag holder 28 with its mated tag enclosure 44 wherein the cap 46 fits into the cap receptacle 30, the tag band contact 52 inserts into the band tag contact 32, and the tag loop contact 50 inserts into the loop tag contact 34. FIG. 4b shows a top isometric view of the tag enclosure 44 and the unique shape of the cap 46 which permits ready tag enclosure 44 removal when required.

Figure 5A:
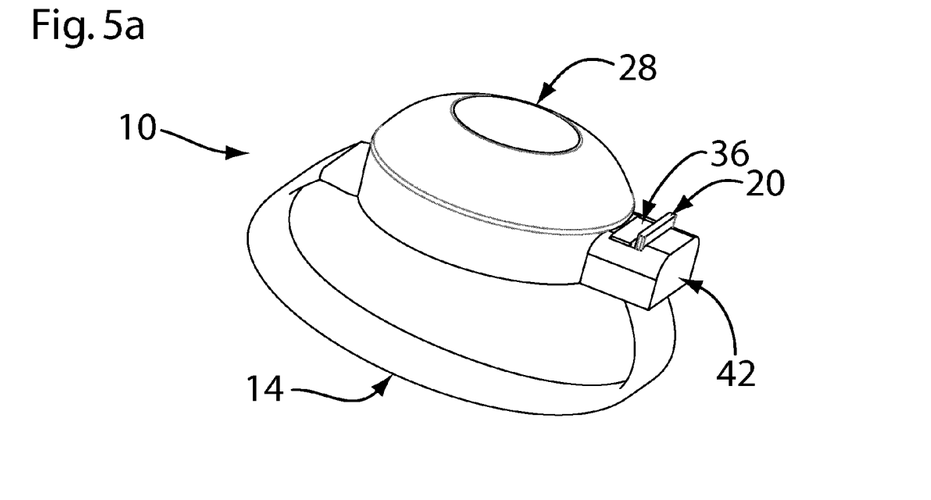
FIG. 5a shows an isometric view of the Anti-tamper Conductive Plastic Band for RFID Tag as worn.
Figure 5B:
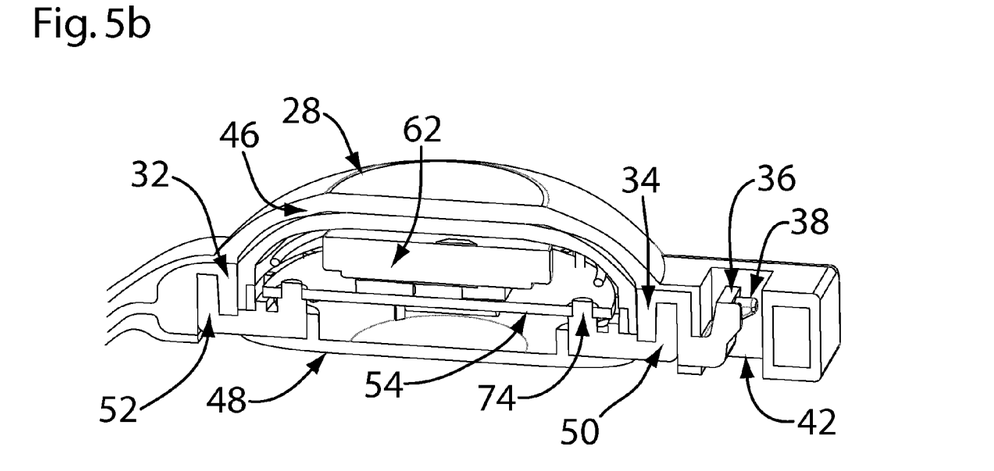
FIG. 5b shows a close-up cutaway isometric view of a tag holder with its RFID tag enclosure inserted.

FIG. 5a shows an isometric view of the complete Anti-tamper Conductive Plastic Band for RFID Tag 10 as it might be worn, with the band 14 slotted through the loop 42 and secured by the internal pawl arm 36. FIG. 5b shows a close-up cutaway isometric view of a tag holder 28 with its inserted tag enclosure 44, illustrating how the contacts mate as described in FIG. 4a. For example, by means of the inserted contact pin 74, the PCB 54 connects to the tag loop contact 50, which slots into the loop tag contact 34, which projects a pawl arm 36 with its anti-tamper pin 38 (and continuity pin 40 see FIG. 3c) into the loop 42.

Figure 6A:
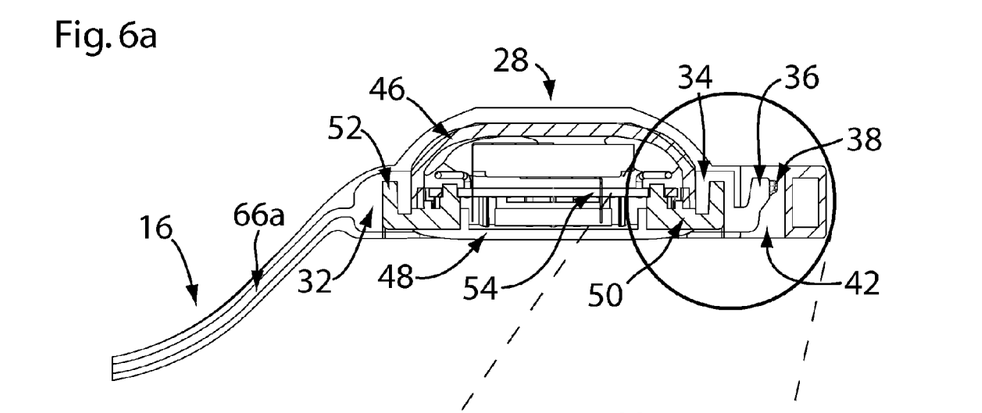
FIG. 6a shows a cutaway side view of a tag holder with its inserted RFID tag enclosure.
Figure 6B:
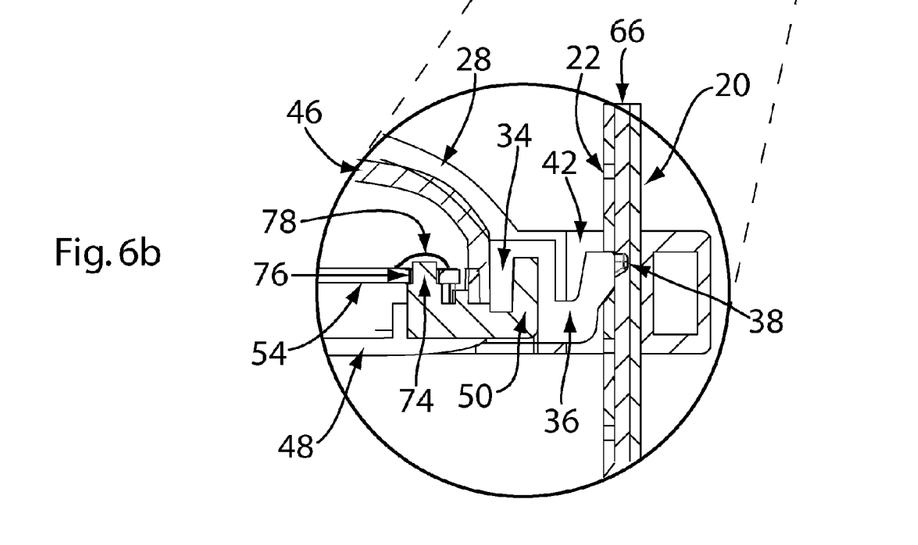
FIG. 6b shows a close-up cutaway side view of the loop region with its band inserted, and part of the PCB region.

FIG. 6a shows a cutaway side view of a tag holder 28 with its inserted tag enclosure 44, with FIG. 6b showing a close-up cutaway side view of the loop 42 and PCB 54 region in FIG. 6a. In this close-up view the securement section 20 of a band 14 is locked by the anti-tamper pin 38 of the pawl arm 36. (and continuity pin 40 see FIG. 3c) Also shown is one method of electrically connecting the contact pin 74 of the tag loop contact 50, by means of conducting adhesive 78 applied to the conductive contact pad 76 of the PCB 54.

Figure 7A:
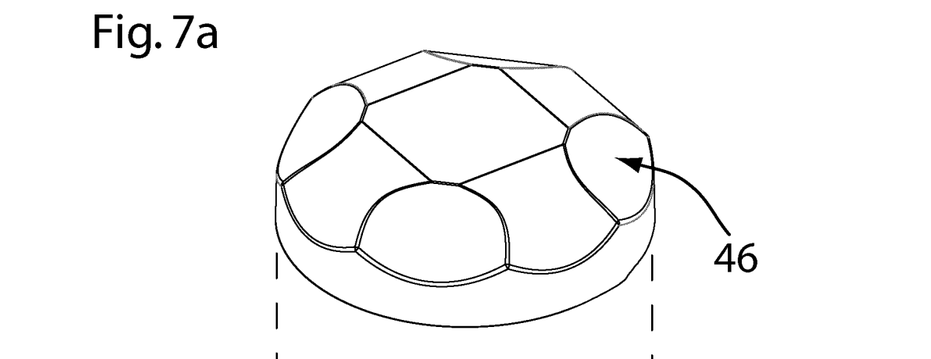
FIG. 7a shows a top isometric view of the tag enclosure cap.
Figure 7B:
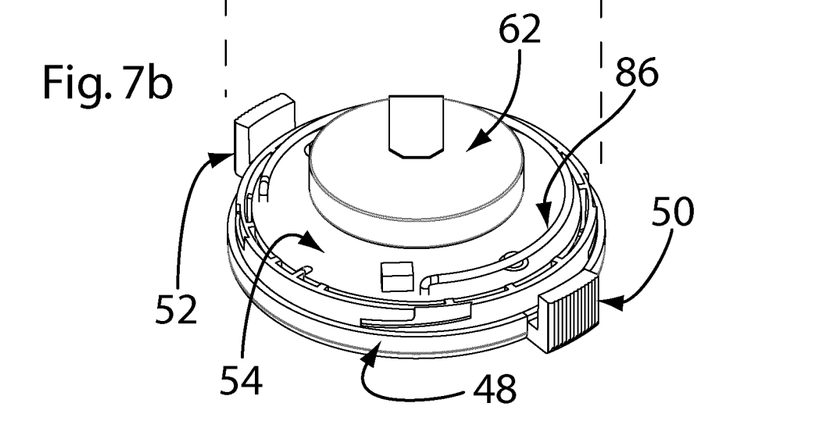
FIG. 7b shows a top isometric view of the PCB inserted into the tag enclosure base. (with battery).
Figure 7C:
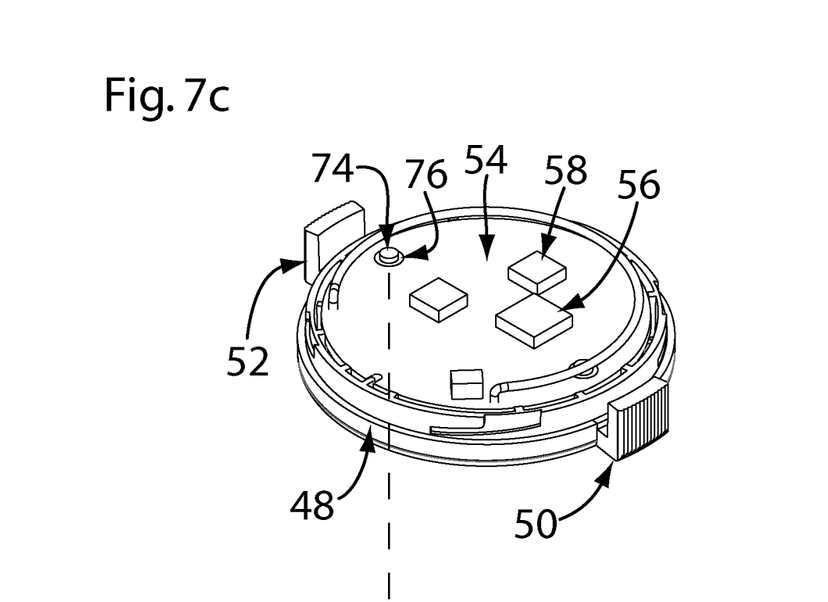
FIG. 7c shows a top isometric view of the PCB inserted into the tag enclosure base. (without battery).
Figure 7D:
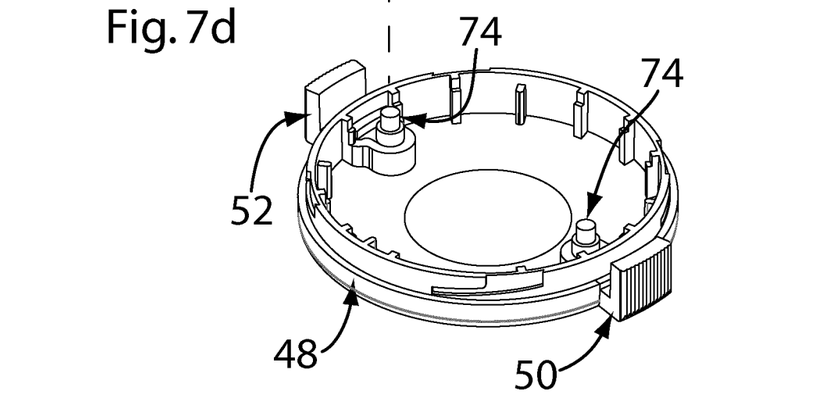
FIG. 7d shows a top isometric view of the tag enclosure base.
Figure 7E:
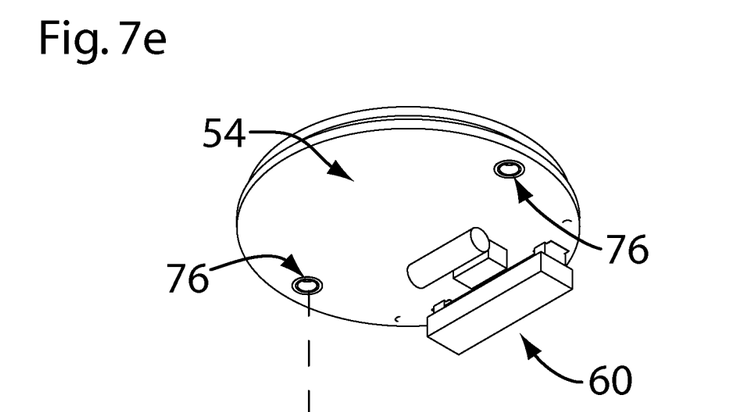
FIG. 7e shows a bottom isometric view of the PCB.
Figure 7F:
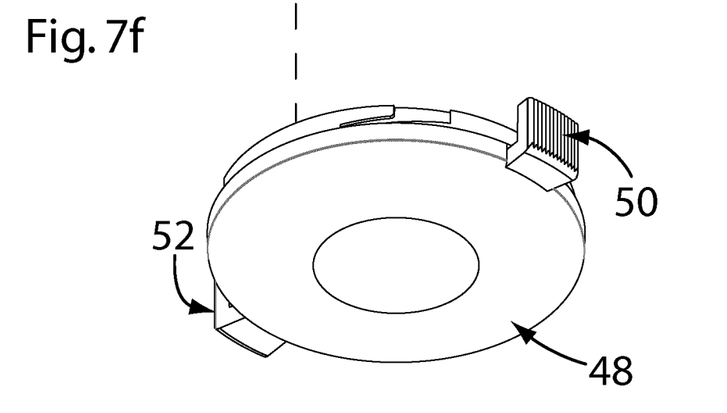
FIG. 7f shows a bottom isometric view of the tag enclosure base.

FIG. 7a shows a top isometric view of the tag enclosure cap 46 as it would mate with its base 48 in FIG. 7b. FIG. 7b shows a top isometric view of the PCB 54 inserted into the tag enclosure base 48 with a battery 62 and RFID antenna wire 86. FIG. 7c shows a top isometric view of the PCB 54 without the battery 62, revealing the microcontroller 56 and current detector 58 integrated circuitry. Also shown is how the contact pin 74 fits into the PCB's contact pad 76. FIG. 7d shows a top isometric view of the tag enclosure base 48 and revealing the contact pins 74 as they align with the PCB 54 above. FIG. 7e shows a bottom isometric view of the PCB 54, exposing the RFID tag electronics 60. FIG. 7f shows a bottom isometric view of the tag enclosure base 48 and how its tag band contact 52 inserts into the contact pad 76 in the PCB 54 in FIG. 7e above.

Figure 8A:
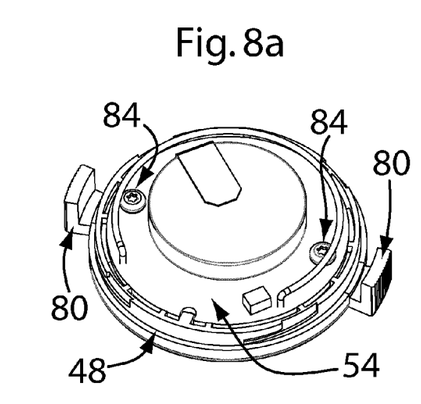
FIG. 8a shows a top isometric view of a PCB connected to fastened tag contacts.
Figure 8B:
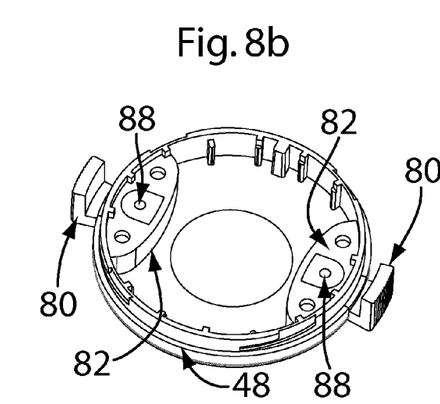
FIG. 8b shows a top isometric view of a base with tag contact seats employed with fastened tag contacts.
Figure 8C:
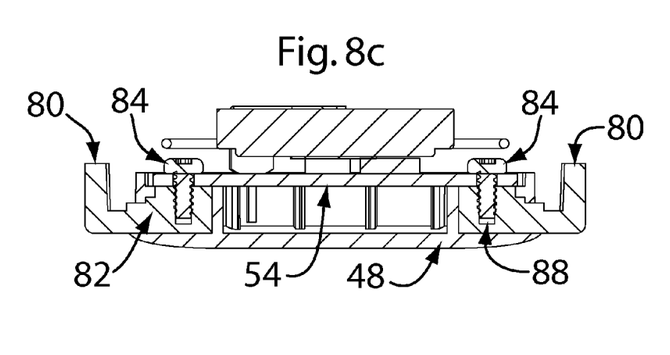
FIG. 8c shows a side cutaway view of a PCB connected to fastened tag contacts.

FIGS. 8a to 8c relate an alternate means to connect tag contacts to a PCB 54 and secure them to the base 48 of a tag enclosure 44. FIG. 8a shows a top isometric view of a PCB 54 connected to fastened tag contacts 80 by means of fasteners 84. FIG. 8b shows a top isometric view of a base 48 with the tag contact seats 82 employed with fastened tag contacts 80, and in this view revealing fastener holes 88. FIG. 8c shows a side cutaway close-up view of a PCB 54 connected to contact pads 76 (see FIGS. 7c & 7e) by means of fasteners 84 screwed into each fastener hole 88 in fastened tag contacts 80. Conducting adhesive 78 may also be used in each fastener hole 88 to increase continuity reliability and fastener 84 integrity in this critical connection.

The preferred embodiment of the Anti-tamper Conductive Plastic Band for RFID Tag will now be described in detail.

The disclosed Anti-tamper Conductive Plastic Band for RFID Tag 10 employs a conductive plastic core 64 as contacts to the tag enclosure 44, as the conductive portion of the band 14, and as contacts within the tag holder 28 loop 42. (see FIGS. 1b to 3c) Conductive plastic has the flexibility and durability of plastic (polyethylene), but instead of acting as an electrical insulator, it can conduct electrical current when enriched with carbon or another material with similar conductive properties. Note that the conductive plastic of the band & loop tag contacts (32 & 34), pawl arm 36 and pins (38 & 40) can be both thicker and/or of higher strength (stiffer) composition than the conductive plastics material which forms the thinner portion 66a of the band core 66 (see FIGS. 3a to 3c). This is to ensure that the band 14 is flexible and soft enough for comfortable wear, while at the same time ensuring the tag contacts are strong enough to make durable and reliable electrical contact. Fully sealed transition between the electronic circuitry inside the tag enclosure and outside of the tag enclosure which can be ensured by an over-moulding injection process where two different plastic materials are used to create a) a relatively hard RFID tag holder for a tight fit with an RFID tag and a hard tongue portion for ease of insertion in the loop, and b) a softer middle portion of the electrically conductive band for comfort and flexibility of fit around a wrist on a patient.

The electrical continuity path that ensures the integrity of the Anti-tamper Conductive Plastic Band for RFID Tag will now be discussed. As shown in FIGS. 5b & 7b, the tag enclosure 44 houses a PCB 54, from which a battery 62 generates electrical current to the tag contacts (50 & 52). Tag contacts are embedded into the base 48 of the tag enclosure 44 by means of an over-moulding plastics injection process. The PCB 54 is then placed into the base 48 of the tag enclosure 44 and each tag contact is secured and electrically connected to the PCB 54 with conducting adhesive 78 or by a screw fastener 84 threaded into the hole 88. After installing a cap 46 onto the base 48 the tag enclosure 44 is closed and fully sealed (see FIGS. 7a, 7b, & 4b). By inserting the tag enclosure 44 into the cap receptacle 30 (see FIGS. 4a & 6a), electrical connection between the tag holder 28 and the tag contacts is accomplished.

The current source from the battery 62 inside the tag enclosure 44 is now available at the band tag contact 32. The loop tag contact 34 is connected to an electrical current detector 58 with an analog to digital converter. Both the battery 62 and current detector 58 are controlled by a microcontroller 56. (see FIG. 7c) The microcontroller 56 monitors and controls how the current generated by the battery 62 is detected by the current detector 58. When the tongue 26 of the band 14 is inserted into the loop 42, and the securement section 20 engages the pawl arm 36, its protective anti-tamper pins 38 seat into the band's anti-tamper dimples 22, while the protected continuity pin 40 seats into the continuity dimple 24. Current flows from the conductive plastic band core 66 at the bottom of the continuity dimple 24, through the continuity pin 40, down the pawl arm 36, from the loop tag contact 34 to the tag loop contact 50, and by means of the contact pin 74 or the screw 84, back to the PCB 54. By this means the current is detected and the circuit is completed and the Anti-tamper Conductive Plastic Band for RFID Tag 10 is armed. If the conductive plastic core 64 of the band 14 is severed, or the continuity pin 40 is disconnected from the continuity dimple 22, even momentarily as might happen in a jumper attack, the tamper alarm would be activated.

The shape of the pins projecting from the pawl arm 36 and the shape of the dimples on the band where these pins make contact are designed to make a reliable and firm physical connection between the band 14 and the tag holder 28. This connection prevents the band 14 from being loosening once it is fastened onto the patient and also ensures reliable electrical contact. The shape of the contacts within the loop 42 of the tag holder 28 also permit limited pivoting of the band 14 portion closest to the loop 42 so that the wearer will not create false alarms by merely adjusting the Anti-tamper Conductive Plastic Band for RFID Tag 10 for comfort. This is made possible by a central continuity pin 40 projecting from a flexible pawl arm 36, as well as the elongated dimples in the securement section 20 of the band 14. (see FIG. 1c)

The banded tag holder 12 is made by means of an over-moulding process, whereby the conductive plastic inner core 64 of the band 14 is over-moulded with a rubberized material which provides electrical insulation and mechanical support. This support means that the conductive plastics may be relatively thin and narrow so as to allow for the greater mechanical flexibility necessary for comfortable wear. Partial covering of the conductive portion of the band 14 ensures better protection against the "alligator clip attack" described earlier, which is the weakness of similar products currently available.

Another advantage of embedding conductive plastics within a rubber shell is the increased security from tamper attacks. Notice that the continuity pin 40 is protected by an anti-tamper pin 38 on each side of the pawl arm 36, as well as by the fact that it is protected by the surrounding rubber shell material around each dimple. If one were to attempt to jumper around the continuity pin 40, one would have to force their way through the flanking anti-tamper pins 38 and the rubber band material, and in the attempt the disconnection would be detected by the current detector and the tamper alarm triggered.

An alternate embodiment of the Anti-tamper Conductive Plastic Band for RFID Tag includes a different method of attaching tag contacts to the PCB 54. As shown in FIGS. 8a to 8c, a fastened tag contact 80 is over-molded into a tag contact seat 82 in the base 48. Then a fastener 84 may be used to secure the PCB 54 into the fastener hole 88 in said contact 80. The fastener 84 creates electrical contact between the contact pad 76 (see FIG. 7c) of the PCB 54 and the fastener hole 88 of the fastened tag contact 80. A conducting adhesive 78 may also be used to improve both electrical and mechanical contact. Other embodiments are not ruled out or similar methods leading to the same result.

Other advantages of using the Anti-tamper Conductive Plastic Band for RFID Tag 10 over other methods or devices will now be described. The use of hard conductive plastics as a material for tag contacts ensures a fully sealed connection between the electronic circuitry inside the tag enclosure 44 and the conductive plastic band & loop contacts embedded in the rubberized tag holder 28 surrounding the tag enclosure 44. This prevents the ingress of water in the region where the metallic PCB contacts and the tag holder 28 contacts meet, a hazard which occurs in existing cut-band RFID tag designs which utilize metallic PCB contacts. The present invention also eliminates the problem created by corrosion of metallic contacts which occur due to use of corrosive medical solvents to clean the tag after every use. The corrosion creates unreliable electrical connection due to the oxide layer created, whereas conductive plastic materials cannot corrode.

The use of soft conductive plastic materials the RFID tag band and the tag holder provides the following benefits, namely the conductive portion of the band can be fully embedded within the non-conductive, rubberized outer shell, thereby preventing "alligator clip attack" by controlling [reducing] the size and position of openings where the contact between the band and the tag holder is made. The band should be made thinner in a middle portion of its length in order to increase its overall flexibility and comfort around a patient's wrist, and thicker toward each of its ends in order to ensure the tongue can be inserted through the loop and to provide additional strength where attached via the tongue and loop. The design of the loop and pawl pins allows for limited movement without false triggers, yet still prevents tamper attempts.

The shape of the contact within a tag holder loop and the shape of the landing area on the band which is being inserted through the loop can such as to allow easy movement of the band end through the loop in one direction (inserting the band into the loop), but more difficult movement in opposite direction (this is "zip-tie effect"). One zip-tie shape that accomplishes this effect is to have a bevel on the tonque-insertion (leading) side of the pawl pin or tab within the receiving loop, but a right-angle edge on the distal side of the pawl pin or tab. The bevels could alternatively be on a non-leading side only of each dimple or slot structure, as shown in the continuity dimple 24 in FIG. 1c for example. This "one-way beveling" results in a ratchet mechanism that is embodied not only in the continuity pins/tabs and corresponding dimples/slots, but also in the anti-tamper pins/tabs and corresponding anti-tamper dimples/slots. It allows ease of attachment, but once the pin/tab has caught in any particular corresponding dimple/slot on the tongue, it is more difficult to pull the tongue back out of the loop. When applied to the present invention, this prevents accidental loosening of the band once when it is applied on the patient. Even though the movement of the band in opposite direction is difficult, it is still possible (when band loosening is absolutely required) if the appropriate force is applied. When the band is being loosened there is an interruption of current flow while the loop contact is moving from the one landing area on the band to the other, as the loop contact has to travel over rubberized outer shell which is not conductive. Firm connection between the loop contact and the conductive portion of the band ensures reliable electrical connection. This is achieved by the shape of loop contact and the shape of the loop which are both flexible and designed to allow movement as the band moves into the loop. The movement allows the band to move in at the expense of the increased pressure on the band. This increased pressure creates increase in contact reliability.

The foregoing description of the preferred apparatus and method of installation should be considered as illustrative only, and not limiting. Other forming techniques and other materials may be employed towards similar ends. For example, the anti-tamper pin could be tab-shaped and the complementary anti-tamper dimples could be correspondingly slot-shaped to receive and fit the anti-tamper pin. Likewise the electrical continuity pin could be tab-shaped and the complementary continuity dimples could be correspondingly slot-shaped to receive and fit the continuity pin. It would be also be a functional equivalent to have the anti-tamper dimple in the loop, with a series of anti-tamper pins on the tongue. Again, interlocking ribs could be used instead of tabs and slots. These would all be functional equivalents for the locking and electrical interaction between the tongue and loop. Likewise, it would be a functional equivalent to have an electrical continuity dimple in the loop and a series of electrical continuity pins on the tongue. Various other changes and modifications will occur to those skilled in the art, without departing from the true scope of the invention as defined in the above disclosure, and the following general claims.

We claim:

1. An electrically conductive band for an RFID tag having: a) an RFID re-usable tag holder; b) an electrical continuity contact within a loop on an end of the electrically conductive band; c) an electrically conductive landing area on a tongue of the band; the tongue being insertable through the loop to secure the band around a body to be monitored by an RFID system, the tongue thereby engaging a portion of the electrically conductive landing area with the electrical continuity contact, in which the loop and the tongue have an interlocking structure of pins and dimples respectively in which the interlocking structure has one-way bevels to form a ratchet mechanism during attachment of the electrically conductive band to an object or a patient, in order to allow easy attachment yet prevent accidental loosening of the band once when it is attached.

2. The electrically conductive band for an RFID tag of claim 1, in which the loop and the tongue have anti-tamper pin and corresponding anti-tamper dimple one-way bevels, and electrical continuity pin and corresponding electrical continuity dimples with one-way bevels, to form a ratchet mechanism during attachment of the electrically conductive band to an object or a patient, in order to allow easy attachment yet prevent accidental loosening of the band once when it is attached.

3. The electrically conductive band for an RFID tag of claim 1, in which the RFID tag holder has a loop tag electrical contact and a band tag contact.

4. The electrically conductive band for an RFID tag of claim 3, further comprising an RFID tag having a complementary couple of RFID electrical contacts, each joined with an electrical current detector in the RFID tag.

5. The electrically conductive band for an RFID tag of claim 4, in which the complementary couple of RFID electrical contacts are located on the RFID tag such that when the RFID tag is inserted in the RFID holder, the RFID electrical contacts make electrical contact with the loop tag electrical contact and the band tag contact respectively.

6. The electrically conductive band for an RFID tag of claim 5, in which an electrically conductive circuit is formed when the RFID tag is placed in the RFID holder and the electrically conductive band is attached to a patient or an object by having the tongue passed through the loop.

7. The electrically conductive band for an RFID tag of claim 6, in which there is a non-conductive outer shell between electrically conductive dimples on the landing area of the tongue that causes an interruption of electrical current flow when the electrical continuity pin passes from one continuity dimple to another upon the band being loosened after attachment.

8. The electrically conductive band for an RFID tag of claim 7, in which the electrical current detector senses a lack of electrical continuity when the electrical continuity pin passes from one continuity dimple to another upon the band being loosened after attachment and signals a tamper alarm condition.

9. The electrically conductive band for an RFID tag of claim 6, in which the electrical current detector senses a lack of continuity when the RFID tag is removed from the RFID tag holder causing the RFID tag to signal a tamper alarm condition.

10. The electrically conductive band for an RFID tag of claim 1, in which the electrically conductive band comprises electrically conductive plastic.

11. The electrically conductive band for an RFID tag of claim 4, in which the RFID electrical contacts are made of hard conductive plastic and shaped to provide a tight fit within the RFID holder and a water-proof transition between electronic circuitry inside the RFID tag and an RFID tag enclosure.

12. The electrically conductive band for an RFID tag of claim 10, in which the electrical conductive band comprises soft conductive plastic to provide flexibility and comfort of fit of the electrically conductive band on a patient.

13. An electrically conductive band for an RFID tag having: a) an RFID tag holder; b) an electrical continuity contact within a loop on an end of the electrically conductive band; c) an electrically conductive landing area on a tongue of the band; the tongue being insertable through the loop to secure the band around a body to be monitored by an RFID system, the tongue thereby engaging a portion of the electrically conductive landing area with the electrical continuity contact, in which an electrically conductive circuit is formed when the RFID tag is placed in the RFID tag holder and the electrically conductive band is attached by having the tongue passed through the loop, and an electrical current detector senses a lack of continuity, when the RFID tag is removed from the RFID tag holder or the band is cut, causing the RFID tag to signal a tamper alarm condition; d) the electrical continuity contact within the loop is a continuity pin shaped to fit within a continuity dimple in the electrically conductive landing area on the tongue; e) the tongue has a series of anti-tamper dimples and the loop has an anti-tamper pin shaped to fit within an anti-tamper dimple in the tongue; f) there is a series of pairs of anti-tamper dimples, with a continuity dimple between each pair, and in which the loop has a corresponding pair of anti-tamper pins, with an electrical continuity pin between the pair of anti-tamper pins; g) the loop and the tongue have anti-tamper pin and corresponding anti-tamper dimple one-way bevels, and electrical continuity pin and corresponding electrical continuity dimples with one-way bevels, to form a ratchet mechanism during attachment of the electrically conductive band to an object or a patient, in order to allow easy attachment yet prevent accidental loosening of the band once when it is attached.

14. The electrically conductive band for an RFID tag of claim 13, in which: a) the electrically conductive band comprises an electrically conductive plastic core within a non-conductive shell to prevent "alligator-clip" circumvention of tamper alarms; b) there is a non-conductive outer shell between electrically conductive dimples on the landing area of the tongue that causes an interruption of electrical current flow when the electrical continuity pin passes from one continuity dimple to another upon the band being loosened after attachment whereby the electrical current detector senses a lack of electrical continuity when the electrical continuity pin passes from one continuity dimple to another upon the band being loosened after attachment and signals a tamper alarm condition; c) the RFID electrical contacts are made of hard conductive plastic and shaped to provide a tight fit within the RFID holder and a water-proof transition between electronic circuitry inside the RFID tag and an RFID tag enclosure; d) the electrically conductive band is thinner in a middle portion of its length in order to increase its overall flexibility and comfort around a patient's wrist and is thicker toward each of its ends in order to ensure the tongue can be inserted through the loop and to provide additional strength where attached via the tongue and loop.

15. The electrically conductive band for an RFID tag of claim 13, the RFID tag holder having a loop tag electrical contact and a band tag contact, and further comprising an RFID tag having a couple of RFID electrical contacts each joined with an electrical current detector in the RFID tag, the couple of RFID electrical contacts being located on the RFID tag such that when the RFID tag is inserted in the RFID holder, the RFID electrical contacts make electrical contact with the loop tag electrical contact and the band tag contact respectively, by which an electrically conductive circuit is formed when the RFID tag is placed in the RFID holder and the electrically conductive band is attached to a patient or an object by having the tongue passed through the loop, and by which the electrical current detector senses a lack of continuity when the RFID tag is removed from the RFID tag holder causing the RFID tag to signal a tamper alarm condition, in which: a) the electrically conductive band comprises an electrically conductive plastic core within a non-conductive shell to prevent "alligator-clip" circumvention of tamper alarms; b) there is a non-conductive outer shell between electrically conductive dimples on the landing area of the tongue that causes an interruption of electrical current flow when the electrical continuity pin passes from one continuity dimple to another upon the band being loosened after attachment whereby the electrical current detector senses a lack of electrical continuity when the electrical continuity pin passes from one continuity dimple to another upon the band being loosened after attachment and signals a tamper alarm condition; c) the RFID electrical contacts are made of hard conductive plastic and shaped to provide a tight fit within the RFID holder and a water-proof transition between electronic circuitry inside the RFID tag and an RFID tag enclosure; d) the electrically conductive band is thinner in a middle portion of its length in order to increase its overall flexibility and comfort around a patient's wrist and is thicker toward each of its ends in order to ensure the tongue can be inserted through the loop and to provide additional strength where attached via the tongue and loop, e) the electrically conductive band has a curved section bending from the RFID tag enclosure to position the electrically conductive band closer to a patient's wrist to which it is attached; f) the RFID tag holder has an opening into which an RFID tag is placed prior to attachment to a patient's wrist, with the electrically conductive band and a base portion of the RFID holder securing the RFID tag within the holder and against the patient wrist after attachment of the electrically conductive band around a patient's wrist.

16. An electrically conductive band for an RFID tag having: a) an RFID tag holder; b) an electrical continuity contact within a loop on an end of the electrically conductive band; c) an electrically conductive landing area on a tongue of the band; the tongue being insertable through the loop to secure the band around a body to be monitored by an RFID system, the tongue thereby engaging a portion of the electrically conductive landing area with the electrical continuity contact, in which an electrically conductive circuit is formed when the RFID tag is placed in the RFID tag holder and the electrically conductive band is attached by having the tongue passed through the loop, and an electrical current detector senses a lack of continuity, when the RFID tag is removed from the RFID tag holder or the band is cut, causing the RFID tag to signal a tamper alarm condition; the RFID tag holder having a loop tag electrical contact and a band tag contact, and further comprising an RFID tag having a couple of RFID electrical contacts each joined with an electrical current detector in the RFID tag, the couple of RFID electrical contacts being located on the RFID tag such that when the RFID tag is inserted in the RFID holder, the RFID electrical contacts make electrical contact with the loop tag electrical contact and the band tag contact respectively, by which an electrically conductive circuit is formed when the RFID tag is placed in the RFID tag holder and the electrically conductive band is attached to a patient or an object by having the tongue passed through the loop, and by which the electrical current detector senses a lack of continuity when the RFID tag is removed from the RFID tag holder causing the RFID tag to signal a tamper alarm condition.

* * * * *